United States Patent [19]

Peerts et al.

[11] 4,102,874

[45] Jul. 25, 1978

[54] PREPARATION OF ORGANIC POLYSULFIDE POLYMERS USING HEAVY RESIDUES FROM VINYLCHLORIDE MANUFACTURE

[75] Inventors: Fernand Peerts, Heverlee; Yvon Delaunois, Tessenderlo, both of Belgium

[73] Assignee: Tessenderlo Chemie S.A., Tessenderlo, Belgium

[21] Appl. No.: 795,600

[22] Filed: May 10, 1977

Related U.S. Application Data

[63] Continuation-in-part of Ser. No. 593,385, Jul. 7, 1975, Pat. No. 4,025,495.

[30] Foreign Application Priority Data

Jul. 11, 1974 [FR] France ................................. 74 24082

[51] Int. Cl.$^2$ .............................................. C08G 75/16
[52] U.S. Cl. ................................ 528/387; 260/33.6 R; 260/33.8 R; 260/37 R; 427/388 R; 428/450
[58] Field of Search ................................. 260/79, 79.1

[56] References Cited

U.S. PATENT DOCUMENTS

| 2,466,963 | 4/1949 | Patrick et al. ........................ 260/79.1 |
| 3,111,545 | 11/1963 | Nobis et al. ........................ 260/79.1 |
| 4,025,495 | 5/1977 | Peerts et al. ........................ 260/79.1 |

Primary Examiner—Melvyn I. Marquis
Attorney, Agent, or Firm—Millen & White

[57] ABSTRACT

In the abatement of a waste disposal problem in the manufacture of vinyl chloride wherein 1,2 dichloroethane is an intermediate and a heavy residue is recovered as still bottoms, from the purification by distillation of dichloroethane and/or vinyl chloride having an organic-origin chloride content ranging between 55 and 80% by weight, wherein said heavy residue is reacted at 50° to 100° C., in aqueous medium with an alkali metal or an alkaline earth metal polysulfide, the proportion of polysulfide being equal at least to 30% by weight of the molar theoretical quantity, the average sulfur rank of polysulfide being more than 1 and up to and including 5, the pH of the reaction medium not exceeding 10.5 when the reaction is completed, and the obtained precipitate is separated from the reaction mother liquor, said precipitate being organic polysulfide polymers containing 4–80% by weight of sulfur, the improvement of using intermediate steps prior to the separation of the precipitate from the mother liquor of:

(a) at the end of the reaction, adding an additional quantity of heavy residue amounting to 10–80% by weight of the quantity of the initially added heavy residue; and (b) acidifying the reaction medium to coagulate the resultant polymer precipitate.

13 Claims, No Drawings

PREPARATION OF ORGANIC POLYSULFIDE POLYMERS USING HEAVY RESIDUES FROM VINYLCHLORIDE MANUFACTURE

CROSS-REFERENCE TO RELATED APPLICATION

This application is a continuation-in-part of copending allowed application Ser. No. 593,385, filed Jul. 7, 1975, now U.S. Pat. No. 4,025,495, issued May 24, 1977, incorporated in its entirety by reference herein.

BACKGROUND OF THE INVENTION

In application Ser. No. 593,385, filed Jul. 7, 1975, now U.S. Pat. No. 4,025,495, issued May 24, 1977, there is recited a process for abating a waste disposal problem in the manufacture of vinyl chloride wherein 1,2 dichloroethane is an intermediate and a heavy residue is recovered as still bottoms, from the purification by distillation of dichloroethane and/or vinyl chloride having an organic-origin chloride content ranging between 55 and 80% by weight, said process comprising reacting said heavy residue at 50° to 100° C., in aqueous medium with an alkali metal or an alkaline earth metal polysulfide, the proportion of polysulfide being equal at least to 30% by weight of the molar theoretical quantity, the average sulfur rank of polysulfide being more than 1 and up to and including 5, the pH of the reaction medium not exceeding 10.5 when the reaction is completed, and the obtained precipitate being separated from the reaction mother liquor, said precipitate being organic polysulfide polymers containing 4–80% by weight of sulfur. After the separation of the precipitate from the mother liquor, it was desirable in many instances for the organic polysulfide polymers to be subjected to a purification stage. It was also desirable in many instances to recover the mineral polysulfides from the aqueous phase.

SUMMARY OF THE INVENTION

An object of this invention is to provide process improvements over the process of Ser. No. 593,385, now U.S. Pat. No. 4,025,495, issued May 24, 1977, especially to increase the reaction rate of the mineral polysulfides, which in turn simplifies or avoids the purification step of the obtained organic polysulfide polymers.

Another object is to obviate the treatment of the aqueous phase for the recovery of the mineral polysulfides.

A still further object is to provide novel polymer mixtures.

Another object is to bring forward all unclaimed subject matter from application Ser. No. 593,385.

Upon further study of the specification and appended claims, further objects and advantages of this invention will become apparant to those skilled in the art.

According to the improved process of this invention, polysulfide polymers containing from 4 to 80% by weight of sulfur are obtained by reacting a heavy residue derived from the manufacture of vinyl chloride with an alkali metal or an alkaline earth metal polysulfide as described above, but at the end of the reaction a new quantity of heavy residue is added amounting to about 10–80% by weight of the quantity of the initially added heavy residue, the reaction mixture being then acidified in order to coagulate the obtained precipitated polymer, and the organic phase being separated from the reaction mother liquor. By "at the end of the reaction" is meant when the added heavy residue has substantially reacted with the inorganic polysulfide after heating as described in Ser. No. 593,385.

Comparative tests have shown that the addition of heavy residue in two fractions increases the reaction rate of the mineral polysulfide. It has also been unexpectedly found that the mineral polysulfide concentration of the aqueous phase at the end of the reaction can be under certain conditions up to a factor of 2.5 lower when the heavy residue is added in two fractions instead of being introduced in a single batch at the beginning of the reaction, all other reaction conditions being equal. It has also been found that especially improved results can be obtained when the total amount of mineral polysulfide ranges between 35 and 60 percent and preferably 40 and 50 percent by weight of the molar theoretical quantity.

As indicated in application Ser. No. 593,385, polysulfide polymers containing less than 45–50% by weight of sulfur which are "miscible" with certain solvents such as 1,2 dichloroethane can be used for the manufacture of weather and salt-resistant paints, or in the form of a solvent solution for the impregnation of porous materials. It has been found that the improvement of this invention is particularly suitable for preparing such polysulfide polymers by using preferably mineral polysulfides having an average sulfur rank comprised between 2 and 2.2. The polysulfide polymers so-obtained are ready to be used directly inasmuch as they are already diluted in the heavy residue, which is a cheap solvent. Moreover, owing to their low viscosity, the obtained polymers can easily be pumped, thereby facilitating the ensuing transportation thereof.

According to this invention, the second fraction of heavy residue to be added at the end of the reaction of the first fraction ranges between 10 and 80 percent by weight and preferably between 25 and 75 percent by weight of the amount of the initially added heavy residue. It has been found that when an amount lower than 10 percent by weight of the initial amount of heavy residue is used, the mineral polysulfide content of the aqueous phase at the end of the reaction is excessive. Conversely, by using an amount of heavy residue higher than 80 percent by weight of the initial amount, the mineral polysulfide content of the aqueous phase does not vary substantially and the obtained polysulfide polymers contain too large proportion of diluent.

The heavy residues used in the practice of this invention are the same products as those described in Ser. No. 593,385. It has been observed that this invention is also suitable when using heavy residues containing large proportions of 1-2 dichloroethane which may be even higher than 20 percent by weight based on the weight of the heavy residues under bad plant operating conditions.

In the practice of the improved method, the process is at first operated as described in Ser. No. 593,385. For example, in a solution of alkali metal polysulfide maintained at a temperature in the range of 50°–80° C., the heavy residue to be treated is added. The reaction of the residue is exothermic and the temperature of the reaction mixture rises up to about 70°–85° C. The heavy residue is introduced by stirring over a period of about 5 minutes to 2 hours, preferably in 10 to 30 minutes. Then the reaction mixture is heated and maintained at 80°–100° C. by stirring for 1 to 5 hours. The halogenated compounds contained in the heavy residue which, owing to their low boiling-point, tend to escape the reaction medium, are condensed and may be recovered or eliminated, for example by combustion.

According to the improvement of this invention, a new amount of heavy residue is then added in the reaction mixture. This new amount of heavy residue is introduced by stirring, preferably in 5 to 30 minutes, the reaction mixture being maintained at temperatures lower than 95° C., preferably in the range of 85° to 90° C. Then the reaction medium is stirred for at least about 90 minutes and preferably not more than 4 hours, more preferably about 2-3 hours.

As indicated in Ser. No. 593,385, the pH of the reaction mixture which is basic must not exceed 10.5 at the end of the reaction, and that applies to the present case after the reaction of the second fraction of heavy residue. When the reaction is completed, the reaction medium is acidified in order to obtain a pH value lower than 5, preferably lower than 1, more preferably in the range of 0.4 to 0.8, by using a diluent solution of acid in order to coagulate the obtained polymer.

According to the improved process of this invention, the reaction between the mineral polysulfide and the heavy residue may be also achieved in the presence of a dispersing agent as described in Ser. No. 593,385. However, the use of a dispersing agent does not entail any substantial improvement in this case, and may generally be disregarded.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

In a reaction vessel equipped as described in Example 1 of Ser. No. 593,385, 552g. of sodium polysulfide having a sulfur rank equal to 2.2 were prepared by the following process. 620g. of technical sodium sulfide containing 60 percent by weight of $Na_2S$ (measured iodometric titration) and 180g. of sulfur were mixed. 1,500g. of water were added; then the reaction medium was heated at about 60° C. with stirring until the solution was homogeneous.

The reaction medium was maintained at 60° C., and 800g of heavy residue were added. The heavy residue contained 12.6% of 1,2-dichloroethane, the content of organic chlorine being equal to 66.17%. This addition of heavy residue was achieved in 10 minutes. The reaction mixture was heated with stirring at 80°-85° C. for 4 hours and 45 minutes.

At this same temperature, 300g. of heavy residue were added corresponding to 37.5 percent by weight based on the initial amount of heavy residue. The amount of polysulfide used in comparison with the organic chlorine is equal to 46.5 percent by weight based on the molar theoretical quantity. The second addition of heavy residue was achieved in 5 minutes and the reaction medium was heated at 90° for 2 hours. When the reaction was completed, the reaction medium had a pH value equal to 8.5. The aqueous phase contained 5.5g/l of sodium polysulfide calculated as $Na_2S$.

The heating of the reaction medium was stopped, and there was then admixed an acid solution (obtained by mixing 100cm³ of hydrochloric acid titrating 18° Baume with 250cm³ of water) in order to coagulate the polymer. After the acidification, the reaction medium had a pH value equal to 0.5.

After settling for 15 hours, the reaction mother liquor was separated from the organic phase. There was obtained 1020g. of a dilute polymer containing 33 percent by weight of sulfur.

EXAMPLE 2

The Example 1 was repeated by treating the same heavy residue but the whole residue (1100g.) was added at the beginning of the reaction.

The aqueous phase contained 13.8g/l of sodium polysulfide calculated as $Na_2S$: for the acidification there was used an amount of acid 2.5 higher than in Example 1. Moreover, after acidification, it was not possible to separate the polymer from the reaction mother liquor by decantation.

EXAMPLE 3

The analysis of a heavy residue from the manufacture of vinyl chloride was achieved by using vapor phase chromatography. The heavy residue had the following composition: 18.5% of 1,2-dichloroethane, 32.8% of 1,1,2-trichloroethane, 7.9% of tetrachloroethylene, 4.7% of 1,3-dichlorobutene-2, 4.1% of 1,1,1,2-tetrachloroethane and 0.4% of 1-bromo 2-chloroethane. The organic chlorine amount was equal to 63.59%.

In a reaction vessel equipped as described in Example 1 of application Ser. No. 593,385, 1100g. of this heavy residue were treated according to the two following methods:

TEST 1: treatment according to Example 1, that is by adding the heavy residue in two fractions: 800g. being added at the beginning of the operation and 300g. being added when the reaction of the first fraction was completed.

TEST 2: treatment according to Example 2, 1100g. of heavy residue being added at once at the beginning of the operation.

In each test the sodium polysulfide had an average rank equal to 2.2 and is used in amounts equal to 44.5 percent by weight based on the molar theoretical quantity. When the reaction was completed, the aqueous phase had 3.90g/l of sodium polysulfide calculated as $Na_2S$ for Test 1 and 9.95g/l for Test 2. After acidification and decantation of the reaction medium, only Test 1 gave polymers diluted in the heavy residue which could be directly used for the preparation of paints.

The two preceding tests were repeated but by using a quantity of sodium polysulfide equal to 52 percent by weight based on the molar theoretical quantity. When the reaction was completed, the aqueous phase contained 19.8g/l of sodium polysulfide calculated as $Na_2S$ in Test 1 and 23.4g/l in Test 2. After acidification and decantation of the reaction medium, only Test 1 gave polymers diluted in heavy residue directly usable for the manufacture of paints.

The two preceding tests were repeated but by using a sodium polysulfide having an average sulfur rank equal to 2.7 in an amount equal to 89.1 percent by weight based on the molar theoretical quantity. When the reaction was completed the aqueous phase contained 112g/l of sodium polysulfide calculated as $Na_2S$ in Test 1 and 138.8g/l in Test 2. In both tests it was not possible to separate the polysulfide polymers directly by acidification, and a preliminary washing step was necessary.

EXAMPLE 4

An analysis of a heavy residue from the manufacture of vinyl chloride prepared according to oxychlorination process was conducted by vapor phase chromatography. The heavy residue contained 12.6% of 1-2 dichloroethane and the organic chlorine content was equal to 66.17%.

In a reaction vessel equipped as described in Example 1 of application Ser. No. 593,385, 800g. of this first fraction of heavy residue was treated according to Example 1 by using a sodium polysulfide having a rank of sulfur equal to 2.2. Six tests were conducted adding different amounts of heavy residue as the second fraction. The following table lists for each test:

The quantity of heavy residue added after reaction of the first fraction; the amount of sodium polysulfide used by comparison with the theoretical molar quantity; the amount of sodium polysulfide calculated as $Na_2S$ (g/l) contained in the aqueous phase before acidification; the amount of obtained polymers; and the content of sulfur of the obtained polymers (in percent by weight).

TABLE

| Amount of heavy residue added after reaction of the first fraction (g) | Percent by weight of sodium polysulfide used by comparison with the theoretical molar quantity (%) | Amount (g/l) of sodium polysulfide calculated as $Na_2S$ and contained in the aqueous phase | Amount of resultant polymer (g) | Content of sulfur in the resultant polymer (% by weight) |
|---|---|---|---|---|
| 100 | 56.8 | 22.5 | 791 | 39.5 |
| 200 | 51.2 | 15 | 886 | 37.0 |
| 300 | 46.5 | 10 | 1024 | 33.2 |
| 400 | 42.6 | 5 | 1090 | 31.0 |
| 500 | 39.3 | 2.5 | 1123 | 30.0 |
| 600 | 36.5 | 2 | 1224 | 26.5 |

70 Parts by weight of the polymer having 31 percent by weight of sulfur were mixed with 30 parts by weight of an isocyanate product sold under trademark "DESMODUR" as described in Example 18 of application Ser. No. 593,385. The obtained product was applied by brushing on a metal. The so-obtained paint was non-tacky to dust after 8 hours, dried after 24 hours, hardened after some days. The resultant coating has a resistance to acid, base and salt solutions.

EXAMPLE 5

An analysis of a heavy residue from vinyl chloride manufacture was conducted by vapor phase chromatography. The residue had the following composition: 30.15% of 1,2-dichloroethane, 27.4% of 1,1,2-trichloroethane, 3.6% of tetrachloroethylene, 2.7% of 1,1,1,2-tetrachloroethane, 2.5% of 1,3-dichlorobutene-2 and 0.6% of 1-bromo 2-chloroethane, and other compounds listed in Example 1 of application Ser. No. 593,385. The organic chlorine content was 67.3 percent by weight.

A first fraction of 800g. of this residue was treated according to Example 1 of this invention by using a sodium polysulfide having a sulfur rank of 2 obtained by mixing 620g. of technical sodium sulfide (containing 60 percent by weight of $Na_2S$) and 150g. of sulfur. When the reaction of the first fraction was completed, 300g. of the heavy residue were added to the reaction medium. The total amount of sodium polysulfide used in comparison with the organic chlorine is 45.8 percent by weight based on the molar theoretical quantity. After reaction of the second fraction of heavy residue, the aqueous phase contained 5g/l of sodium polysulfide caclulated as $Na_2S$.

After acidification of the reaction medium, 1020g. of polysulfide polymer were obtained containing 29.3% by weight of sulfur.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can made various changes and modifications of the invention to adapt it to various usages and conditions.

What is claimed is:

1. In a process for abating a waste disposal problem in the manufacture of vinyl chloride wherein 1,2 dichloroethane is an intermediate and a heavy residue is recovered as still bottoms, from the purification by distillation of dichloroethane and/or vinyl chloride having an organic-origin chloride content ranging between 55 and 80% by weight, said process comprising reacting said heavy residue at 50° to 100° C., in aqueous medium with an alkali metal or an alkaline earth metal polysulfide, the proportion of polysulfide being equal at least to 30% by weight of the molar theoretical quantity, the average sulfur rank of polysulfide being more than 1 and up to and including 5, the pH of the reaction medium not exceeding 10.5 when the reaction is completed, and the obtained precipitate being separated from the reaction mother liquor, said precipitate being organic polysulfide polymers containing 4-80% by weight of sulfur wherein the improvement comprises the intermediate steps prior to the separation of the precipitate from the mother liquor of:
   (a) at the end of the reaction, adding an additional quantity of heavy residue amounting to 10-80% by weight of the quantity of the initially added heavy residue; and
   (b) acidifying the reaction medium to a pH lower than 5 to coagulate the resultant polymer precipitate.

2. A process according to claim 1, wherein said additional quantity of heavy residue amounts to 25-75% by weight of the quantity of the initially added heavy residue.

3. A process according to claim 1, wherein the proportion of alkali metal or alkaline earth metal polysulfide is 35-60% by weight of the molar theoretical quantity.

4. A process according to claim 2, wherein the proportion of alkali metal or alkaline earth metal polysulfide is 40-50% by weight of the molar theoretical quantity.

5. A process according to claim 4, wherein the average sulfur rank of said alkali metal or alkaline earth polysulfide is 2.2 and the resultant organic polysulfide polymers contain 4 to 45–50% by weight of sulfur.

6. A process according to claim 1, wherein step (a) is conducted by stirring at a temperature lower than 95° C.

7. A process according to claim 1, wherein step (a) is conducted by stirring at 85° to 90° C.

8. A process according to claim 1, further comprising stirring the reaction medium at least 90 minutes after step (a).

9. A process according to claim 6, further comprising stirring the reaction medium at least 90 minutes after step (a).

10. A process according to claim 7, further comprising stirring the reaction medium at least 90 minutes after step (a).

11. A process according to claim 1 wherein the pH of step (b) is lower than 1.

12. A process according to claim 1 wherein the pH of step (b) is 0.4 to 0.8.

13. A process according to claim 9, wherein the pH of step (b) is lower than 1.

* * * * *